(12) United States Patent
Banerjee et al.

(10) Patent No.: US 12,181,880 B2
(45) Date of Patent: Dec. 31, 2024

(54) TELEPRESENCE ROBOTS HAVING COGNITIVE NAVIGATION CAPABILITY

(71) Applicant: Tata Consultancy Services Limited, Mumbai (IN)

(72) Inventors: Snehasis Banerjee, Kolkata (IN); Pradip Pramanick, Kolkata (IN); Chayan Sarkar, Kolkata (IN); Abhijan Bhattacharyya, Kolkata (IN); Ashis Sau, Kolkata (IN); Kritika Anand, Hyderabad (IN); Ruddra Dev Roychoudhury, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 362 days.

(21) Appl. No.: 17/814,306

(22) Filed: Jul. 22, 2022

(65) Prior Publication Data
US 2023/0213941 A1    Jul. 6, 2023

(30) Foreign Application Priority Data
Jan. 5, 2022  (IN) .............................. 202221000647

(51) Int. Cl.
*G05D 1/00* (2024.01)
*G06F 40/20* (2020.01)
(Continued)

(52) U.S. Cl.
CPC ......... *G05D 1/0094* (2013.01); *G05D 1/0088* (2013.01); *G06F 40/20* (2020.01);
(Continued)

(58) Field of Classification Search
CPC .. G05D 1/0094; G05D 1/0088; G05D 1/0016; G05D 1/0038; G06F 40/20;
(Continued)

(56) References Cited

U.S. PATENT DOCUMENTS 5,442,728 A * 8/1995 Kaufman ............... G16H 20/13
                                                                  600/300
7,117,067 B2 * 10/2006 McLurkin .............. G06N 3/008
                                                                  701/25
(Continued)

OTHER PUBLICATIONS

Amirsina Torfi, "Privacy-Preserving Synthetic Medical Data Generation with Deep Learning," Dissertation submitted to the Faculty of the Virginia Polytechnic Institute and State University, Doctor of Philosophy in Computer Science and Application, Aug. 10, 2020.
(Continued)

*Primary Examiner* — Mussa A Shaawat
(74) *Attorney, Agent, or Firm* — Finnegan, Henderson, Farabow, Garrett & Dunner, LLP

(57) ABSTRACT

The embodiments of present disclosure herein address unresolved problem of cognitive navigation strategies for a telepresence robotic system. This includes giving instruction remotely over network to go to a point in an indoor space, to go an area, to go to an object. Also, human robot interaction to give and understand interaction is not integrated in a common telepresence framework. The embodiments herein provide a telepresence robotic system empowered with a smart navigation which is based on in situ intelligent visual semantic mapping of the live scene captured by a robot. It further presents an edge-centric software architecture of a teledrive comprising a speech recognition based HRI, a navigation module and a real-time WebRTC based communication framework that holds the entire telepresence robotic system together. Additionally, the disclosure provides a robot independent API calls via device driver ROS, making the offering hardware independent and capable of running in any robot.

11 Claims, 7 Drawing Sheets

(51) Int. Cl.
    *G06V 10/22* (2022.01)
    *G06V 10/82* (2022.01)
    *G06V 20/50* (2022.01)
    *G10L 15/16* (2006.01)
    *G10L 15/22* (2006.01)
    *H04L 67/125* (2022.01)

(52) U.S. Cl.
    CPC .............. *G06V 10/22* (2022.01); *G06V 10/82* (2022.01); *G06V 20/50* (2022.01); *G10L 15/16* (2013.01); *G10L 15/22* (2013.01); *G10L 2015/223* (2013.01); *H04L 67/125* (2013.01)

(58) Field of Classification Search
    CPC ......... G06F 3/011; G06F 3/017; G06V 10/22; G06V 10/82; G06V 20/50; G10L 15/16; G10L 15/22; G10L 2015/223; G05B 2219/40114; G05B 2219/35458; G05B 2219/40518; G05B 2219/40174; B25J 11/0005; B25J 9/1689
    See application file for complete search history.

(56) References Cited

U.S. PATENT DOCUMENTS

| | | | | |
|---|---|---|---|---|
| 7,765,028 | B2 * | 7/2010 | Orita | G05D 1/027<br>700/264 |
| 8,386,078 | B1 * | 2/2013 | Hickman | G05D 1/0246<br>318/568.1 |
| 8,428,777 | B1 * | 4/2013 | Poursohi | G05B 19/41865<br>700/247 |
| 8,892,646 | B2 * | 11/2014 | Chaturvedi | H04L 45/00<br>455/518 |
| 9,008,839 | B1 * | 4/2015 | Kuffner, Jr. | G05B 19/4187<br>700/248 |
| 9,049,262 | B2 * | 6/2015 | Massover | H04L 67/63 |
| 9,821,455 | B1 * | 11/2017 | Bareddy | G06Q 10/06 |
| 2010/0174436 | A1 * | 7/2010 | Matsunaga | G05D 1/0212<br>701/26 |
| 2011/0166701 | A1 * | 7/2011 | Thacher | A01G 25/00<br>700/245 |
| 2011/0288684 | A1 * | 11/2011 | Farlow | B25J 19/023<br>901/1 |
| 2012/0197464 | A1 * | 8/2012 | Wang | G05D 1/0038<br>701/28 |
| 2013/0325244 | A1 * | 12/2013 | Wang | G16H 40/67<br>701/26 |
| 2015/0201160 | A1 * | 7/2015 | Polyakov | H04N 23/661<br>348/14.05 |
| 2020/0276707 | A1 * | 9/2020 | Go | B25J 9/1689 |
| 2020/0324072 | A1 * | 10/2020 | el Kaliouby | G06V 40/168 |
| 2021/0086353 | A1 * | 3/2021 | Shah | B25J 9/161 |
| 2021/0158955 | A1 * | 5/2021 | Azizian | A61B 1/0004 |
| 2021/0208581 | A1 * | 7/2021 | Bhattacharyya | H04L 67/141 |
| 2022/0057791 | A1 * | 2/2022 | Saraf | G05B 13/0265 |
| 2024/0249109 | A1 * | 7/2024 | Shah | G06V 20/10 |

OTHER PUBLICATIONS

Gourav Kumar et al., "Sharing Cognition: Human Gesture and Natural Language Grounding Based Planning and Navigation for Indoor Robots," Aug. 14, 2021. (8 pgs.).

Sebastien Laniel et al., "Toward enhancing the autonomy of a telepresence mobile robot for remote home care assistance," De Gruyter, Journal of Behavioral Robotics, 2021, pp. 214-237.

Paulo A. Condado et al., "Towards Richer Assisted Living Environments," SN Computer Science, Dec. 8, 2021. (13 pgs).

* cited by examiner

TELEPRESENCE ROBOTS HAVING COGNITIVE NAVIGATION CAPABILITY

CROSS-REFERENCE TO RELATED APPLICATIONS AND PRIORITY

This U.S. patent application claims priority under 35 U.S.C. § 119 to Indian Application number 202221000647, filed on Jan. 5, 2022. The entire contents of the aforementioned application are incorporated herein by reference.

TECHNICAL FIELD

The disclosure herein generally relates to the field of telepresence robotics and more specifically, to a telepresence robotic system having cognitive capabilities and method for utilizing the telepresence robotic system having cognitive capabilities.

BACKGROUND

The advent of low cost mobile robotic platform has seen a surge in usage of robots in our daily surroundings. The utility of a mobile robot expanded from personal usage to various other places such as industry, shop floor, healthcare, office etc. Additionally, robots are equally used in collocated and remote setup. As a result, a diverse set of applications have emerged where a mobile robotic platform is used by a remote operator to interact with the environment where the robot is located. These applications can be broadly categorized as telepresence application and tele-operation application. In the telepresence, the robot is essentially a mobile platform where it can move within the environment based on the remote operator's command. In the second category, a robot can perform a set of activities based on the remote operator's instruction. A telepresence robot may or may not perform any manipulation (actuation) activity, whereas a teleoperation robot may or may have mobility capability. As an example, a sick patient can take help of such a setup with varied stakeholders of doctor, nurse, medical body, pharmacy, hospital, administration, and lab diagnostics.

Cooperation among humans makes it easy to execute tasks and navigate seamlessly even in unknown scenarios. With individual knowledge of human beings and collective cognition skills, they can reason about and perform well in unforeseen situations and environments. To achieve a similar potential for a robot navigating among humans and interacting with them, it is crucial for it to acquire the ability for easy, efficient, and natural ways of communication and cognition sharing with humans. In the state of the art, exploiting the human gestures which is known to be the most prominent modality of communication after the speech and incorporation of gestures for communicating spatial understanding can be achieved in a very simple yet effective way using a robot having the vision and listening capability. This shows a big advantage over using only vision and language-based navigation, language grounding or Human-Robot Interaction (HRI) in a task requiring the development of cognition and indoor navigation.

Existing telepresence robotic systems lack rich cognitive navigation strategies. This includes giving instruction remotely over network to go to a point in an indoor space, to go an area, and to go to an object. This does not exist as an integrated solution in remote operation. Also, human-robot interaction to give and understand interaction is not integrated in a common telepresence framework.

SUMMARY

Embodiments of the disclosure present technological improvements as solutions to one or more of the above-mentioned technical problems recognized by the inventors in conventional systems. For example, in one embodiment, a telepresence robotic system having cognitive capabilities and method for utilizing the telepresence robotic system having cognitive capabilities is provided.

In one aspect, a processor-implemented method for utilizing the telepresence robotic system having cognitive capabilities is provided. The method includes one or more steps such as receiving, via a Web-Real Time Communication (WebRTC), one or more audio signals from an operator using a speech based Human Robot Interface (HRI) to perform a plurality of tasks, processing, via a one or more hardware processors, the received one or more audio signals to detect the command instruction using a Convolution Neural Network (CNN) based binary classifier, transmitting, via a cloud and edge based hybrid communication architecture, the detected command instruction to a robot edge for translating into a textual instruction using an automated speech recognition model, identifying, a plurality of tasks from the textual instruction to formulate planning problem based on a Planning Domain Definition Language (PDDL) format, generating, via the one or more hardware processors, an execution plan to map the one or more sub-tasks using an FF-planner and the received snap shots for grounding a location, and executing, via the one or more hardware processors, the generated execution plan through low level API calls to reach the grounded location.

In another aspect, a telepresence robotic system having cognitive capabilities is provided. The system includes a Web-Real Time Communication (WebRTC) to receive one or more audio signals from an operator using a speech based Human Robot Interface (HRI) and one or more visual snap shots from a current Field of View (FoV) of a robot to perform a plurality of tasks. Wherein, the one or more audio signals comprising a command instruction to interact with a robot and an ordinary speech to interact with remote audience through the robot. Further, the system comprises one or more hardware processors and at least one memory storing a plurality of instructions, wherein the one or more hardware processors are configured to execute the plurality of instructions stored in the at least one memory.

Further, the system is configured to process the received one or more audio signals to detect the command instruction using a Convolution Neural Network (CNN) based binary classifier, the detected command instruction to a robot edge for translating into a textual instruction using an automated speech recognition model, identify a plurality of tasks from the textual instruction to formulate planning problem based on a Planning Domain Definition Language (PDDL) format, generate an execution plan to map the one or more sub-tasks using an FF-planner and the received snap shots for grounding a location and execute the generated execution plan through low level API calls to reach the grounded location.

In yet another aspect, one or more non-transitory machine-readable information storage mediums are provided comprising one or more instructions, which when executed by one or more hardware processors causes a method for data migration for a relational database is provided. The method includes one or more steps such as receiving, via a Web-Real Time Communication (WebRTC), one or more audio signals from an operator using a speech based Human Robot Interface (HRI) to perform a plurality of tasks, processing, via a one or more hardware processors, the received one or more audio signals to detect the command instruction using a Convolution Neural Network (CNN) based binary classifier, transmitting, via a cloud and edge based hybrid communication architecture, the detected command instruction to a robot edge for translating into a textual instruction using an automated speech recognition model, identifying, a plurality of tasks from the textual instruction to formulate planning problem based on a Planning Domain Definition Language (PDDL) format, generating, via the one or more hardware processors, an execution plan to map the one or more sub-tasks using an FF-planner and the received snap shots for grounding a location, and executing, via the one or more hardware processors, the generated execution plan through low level API calls to reach the grounded location.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
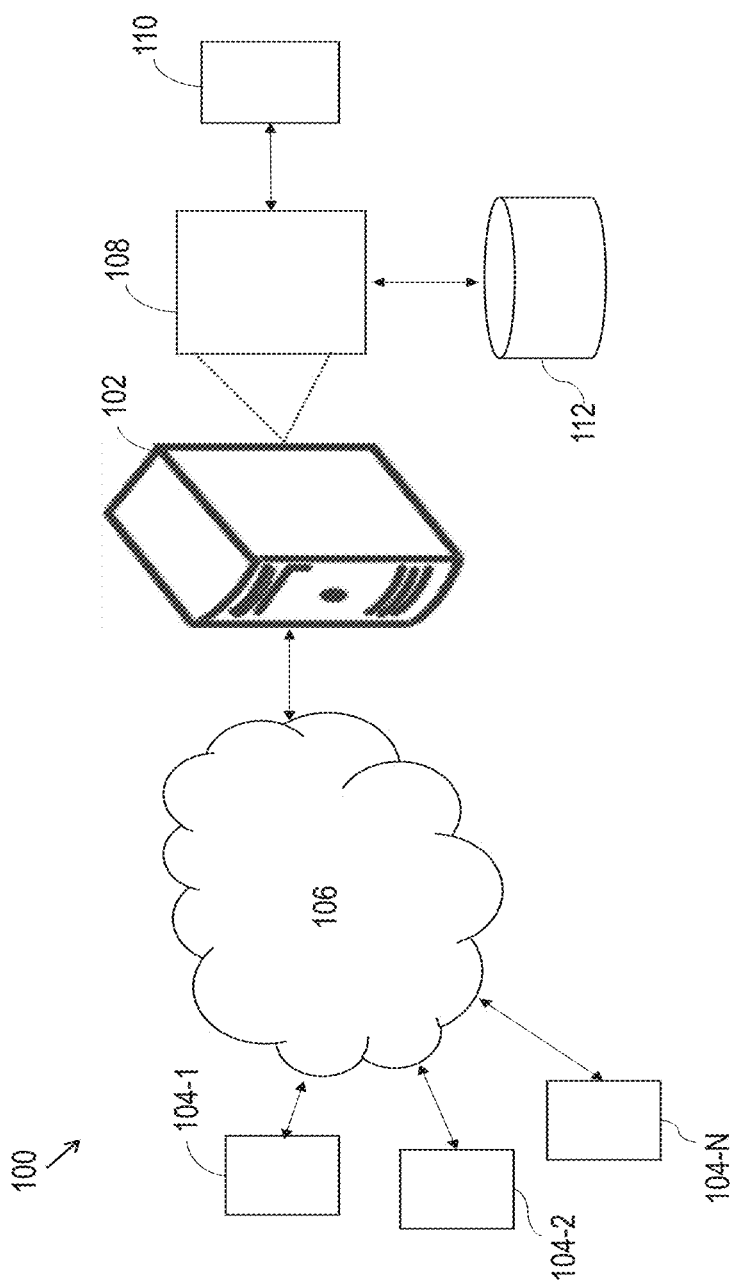
FIG. 1 illustrates a block diagram of an exemplary a telepresence robotic system having cognitive capabilities, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a telepresence robotic system having cognitive capabilities and method for utilizing the telepresence robotic system having cognitive capabilities. The telepresence robotic system provides the flexibility of interacting with a remote environment without physically visiting the place. As a result, numerous applications of telepresence have emerged, and recent times have seen a manifold surge in deployment of robotic telepresence systems. Though there exists a number of off-the-shelf robotic hardware platform for telepresence, a generic software stack for telepresence platforms is scarce. The existing telepresence systems are tightly coupled for an application and does not generalize well for different applications of telepresence. Without a generic architecture, it might be difficult to adapt the software stack for a particular hardware platform and application to another hardware and application with different set of features.

The prevalent pandemic situation demands social distancing as a new normal. Yet, careful monitoring of patients in isolation must be taken care of without risking the lives of care givers. Also, this must be done in a democratized manner such that individual care is possible for geographically distant individuals. Usually, the telepresence robot can address part of this issue. The telepresence system typically maintains a real-time connection with an application at the caregiver's end and acts as an Avatar of the care giver at the patient's premise. The caregiver must navigate the patient's premise in real-time through the Avatar based on the audio-visual feedback as part of the ongoing real-time multimedia chat. In most of the systems the robot Avatar is maneuvered by the remote caregiver through manual instructions using on-screen navigation buttons, etc. However, in an unknown premise, it would be too tedious for the caregiver to manually navigate the robot all the way to the patient's location. It is to be noted that hereinafter robot and avatar is used interchangeably.

The disclosure herein presents the telepresence robotic system empowered with a smart navigation. It would be noted that hereinafter system, and telepresence robotic system may be used interchangeably. Herein, the system has been conceived in the context of remote care-giving for elderly people as well as for isolation patients in a pandemic situation. In particular, the system focuses on the navigation problems of point, area, and object, whereby the robot needs to reach a target location based on the visual cues, priors, trained predictions. Further, the system provides in situ intelligent visual semantic mapping of the live scene captured by the robot. It further presents the telepresence robotic system with an Edge-centric architecture comprising a speech recognition based Human Resource Interface (HRI), a navigation module and a real-time WebRTC based communication framework that holds the entire system together. The disclosure establishes the efficacy of the proposed smart navigation algorithm through benchmarking experiments and finally concludes by describing a real-life deployment of the system.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 illustrates a block diagram of an exemplary telepresence robotic system (100) having cognitive capabilities, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory (110) with a plurality of instructions, one or more databases (112), and one or more hardware processors (108) which are communicatively coupled with the at least one memory to execute a plurality of modules (114) therein. The components and functionalities of the system (100) are described further in detail.

It would be appreciated that many applications in several domains like telemedicine, remote inspection/quality control activities etc. need collaboration of remote experts for effective utilization of resources and achieve a collective goal. For example, multiple experts may need to join a remote quality control session to judge the subject from multiple aspects. Such scenarios require multiple human users remotely connect the robot simultaneously in a single telepresence session, only one of the users become the operator for the duration of a given task to accomplish and takes exclusive control of the robot for commanding while all users continue to participate in a multimedia conferencing. Once the task is completed the existing operator can relinquish the control and another user may assume operator role and control the robot. Such collaborative multi-presence with exclusive yet federated robot control is not present in the existing systems.

Figure 2:
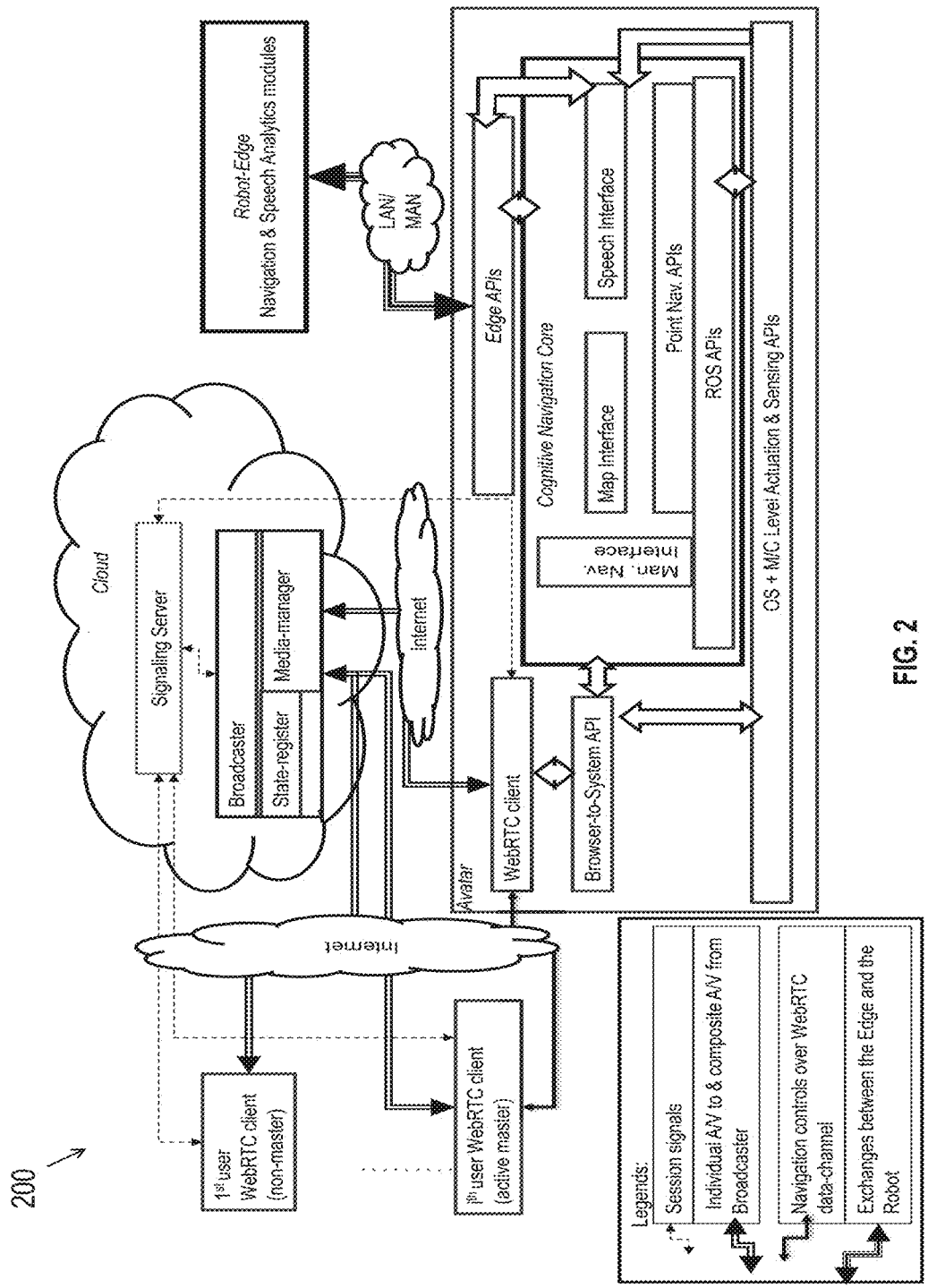
FIG. 2 illustrates an overview of a distributed hybrid platform of the telepresence robotic system, according to an embodiment of the present disclosure.

Referring FIG. 2, a functional block diagram (200) to illustrate an overview of a distributed hybrid platform of the telepresence robotic system (100), according to an embodiment of the present disclosure. The disclosure proposes a software architecture for a telepresence robotic system that is not only platform independent, but also allows customization for different application requirements. Moreover, the usage of a robot-edge as a computation device enables the telepresence robotic system (100) to include any advanced machine learning pipeline to an application without any resource constraint while maintaining any real-time constraints. Further, the telepresence robotic system (100) allows collaborative multi-presence with exclusive yet federated control. A multi-modal cognitive navigation capability to guide the robot in complete manual as well as semi-automatic mode. The telepresence robotic system (100) provides an edge computing-based architecture and the application layer protocol suit to command the robot in a contact-less manner through a speech human robot interface (HRI). The voice instruction from the remote operator is inferred to generate the navigation target.

Herein, a Web-Real Time Communication (WebRTC) of the telepresence robotic system (100) is configured to receive one or more audio signals from an operator using a speech based Human Robot Interface (HRI) and one or more visual snap shots from a current Field of View (FoV) of a robot to perform a plurality of tasks. The one or more audio signals comprising a command instruction to interact with a robot and an ordinary speech to interact with remote audience through the robot. It is to be noted that in a telepresence system, the robotic platform is primarily used to interact with the human beings. However, occasionally the operator can control the robot and instruct it to perform a set of tasks/activities. This includes navigate to a location with the (indoor) environment, move closer to or further away from an object/person, tilt the camera, zoom onto some object, etc. However, instead of manually controlling the robot through a continuous set of control commands, autonomous action by the robot based on command instruction is very much desirable. This requires a robust human-robot interaction module. Further, the telepresence robotic system (100) is configured to process the received one or more audio signals to detect the command instruction using a Convolution Neural Network (CNN) based binary classifier. It would be appreciated that the detected command instruction is transmitted to a robot edge.

Figure 3:
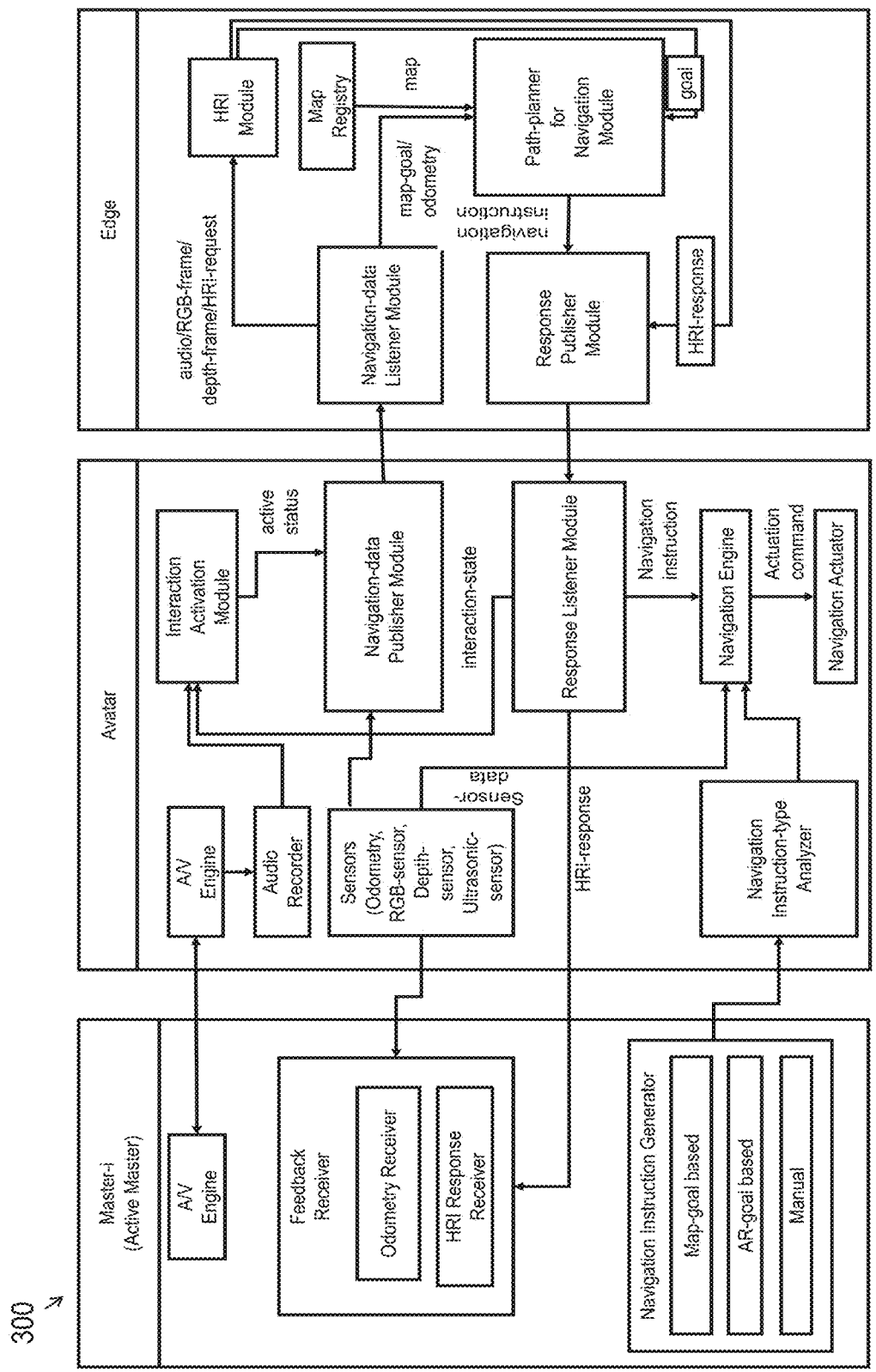
FIG. 3 is a functional block diagram to illustrate the telepresence robotic system, according to an embodiment of the present disclosure.

Referring FIG. 3, a functional block diagram (300) to illustrate telepresence robotic system (100), according to an embodiment of the present disclosure. Herein, the telepresence robotic system (100) comprises of three major components a master, an avatar, and an edge. The master is a remote device like smartphone or laptop, used by a remote user to communicate and control the robot. The avatar is the screen of the actual robot like a tablet attached to the robot. For example, if a remote doctor wants to control the robot to see a patient, the patient will see the doctor's face in that avatar screen attached to robot. Due to limitations of computing power on battery run robot, major computation intensive tasks need to be carried out in a separate compute machine, namely an Edge, which is close by connected over local network.

In the master end, the NV engine renders the live video feed of robot view along with interaction user interface. The master end has audio speaker and microphone attached. Feedback is received from the robot in terms of odometry, where the robot has moved and current location, and the HRI response from robot end user. Also, the user interfaces are built on the screen to make navigation easier using a map and clicking on it, using a click icon to emulate AR goal based navigation, and UI controls of left, right, forward, back and stop for manual navigation.

Further, on the avatar end, audio is recorded coming from the master side via NV engine and is processed through the interaction module to check if wake-word is pronounced and accordingly, instruction channel is activated. The audio instruction will be passed to the edge processing to detect the task type (like navigation to a point). A navigation engine of the telepresence robotic system will follow the actuation command coming from the HRI or directly from the navigation instruction generator module at the master end, post analysis of instruction. The Edge is responsible for majority of computing at the robot end. From processing audio instruction to map it to task instruction, to navigating using path planners, given a goal. A map registry is maintained to load specific map for a region the robot is in. Response if passed to master in terms of actual navigation and/or interaction feedback if the robot has ambiguity in understanding audio instruction.

Since a speech interface is the most intuitive and the operator friendly way to interact with a robot, the telepresence robotic system (100) also supports a speech based task instruction to the robot. However, most of the time what the operator says is meant for the remote audience. To distinguish the control instruction for the robot and ordinary speech, the telepresence robotic system (100) provides a protocol of prefixing the control instruction with a command word. This is common for many personal assistant systems where a wake ward is spoken first before giving any instruction to the assistant. Now, whenever an audio signal is received by the robot, which is detected using a voice activity detection (VAD) module, it is further processed for the command word detection. If there is no command word, no further action is taken. On the other hand, if the command word is defected, the command mode is activated. The command word is detected using a CNN based binary classifier. The model takes any audio chunk and outputs whether the audio chunk contains the command word or not.

It is to be noted that the edge-computing helps offload computation required for the cognitive tasks by the robot. The edge may be an in-situ computer connected over local Wi-Fi or it may be inside the network provider's infrastructure. The communication mechanism coupling the telepresence robotic system (100) has two major aspects: (1) to realize collaborative multipresence session (CMS) and (2) to coordinate amongst computation modules distributed between the edge and the robot and the CMS on robot. Herein, the CMS is maintained by the WebRTC compatible browsers on every peer. The first part is ensured by a unique application layer on WebRTC. The salient feature is that it supports a unique hybrid topology to address diverging Quality of Service (QoS) requirements of different types of data. An NV is exchanged between the robot and the remote users through a cloud centric star topology over a Secure Real-time Transport Protocol (SRTP) based WebRTC media channel. But the delay-sensitive control signals from an active operator to the robot is exchanged over a P2P data-channel on SCTP established directly between the active operator and robot on demand.

This is unlike usual WebRTC topologies which support either of mesh or star topologies using its inherent P2P mechanism. Apart from the signal server (SS), which maintains the session, the cloud hosts a special peer called Broadcaster consisting of a state-register (SR) and a media-manager (MM). The Broadcaster is the nodal point of the star by establishing individual P2P connections with all the peers. We define a special signaling protocol so that the SR can maintain the state of the Avatar and the remote users which helps to keep track of whether the Avatar is free or occupied by any remote user. If free, the $i^{th}$ user willing to control the robot may request the SS through our unique signaling protocol. The SS signals the Broadcaster to update the SR by promoting $i^{th}$ user as the active Operator and establishes a P2P data-only session directly between the robot and the Operator and sends the updates about the active operator to all the peers. The MM operation is not affected by this. The MM keeps on receiving the individual media streams from all the peers including the robot and sends a per-recipient customized composite video with all the peers except the recipient.

To infer the commands from the user in various forms for cognitive decision-making and exchange feedbacks, the robot maintains a WebSocket based Browser-to-System (BTS) Application Programming Interface (API) to enable exchange between the WebRTC based protocol and the low-level system and a Cognitive Navigation (CN) engine. The major analytics of the CN happens in the edge except the manual and basic augmented reality (AR) based point navigation. In manual mode the robot receives discrete commands (Forward, Back, Left, Right) on the data channel which get translated via a linear velocity motion controller on the robot to low level commands. The magnitude of the movement can be controlled by tuning the parameters of the controller.

Figure 5A:
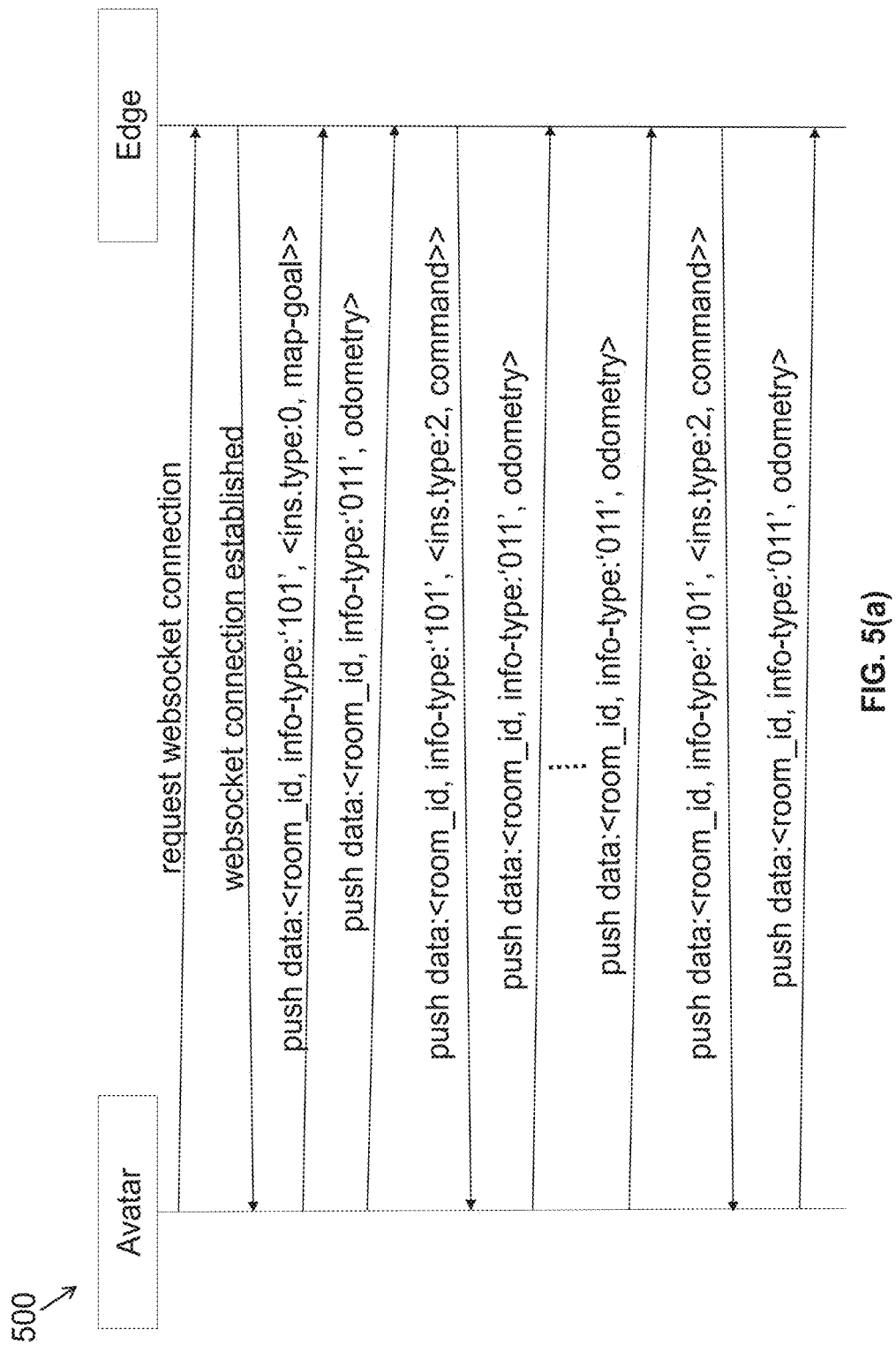
FIG. 5(a) and FIG. 5(b) show a typical exchange for the communication protocol between the Edge and the robot for computation offloading and decision sharing for speech analysis and navigation execution, in accordance with some embodiments of the present disclosure.
Figure 5B:
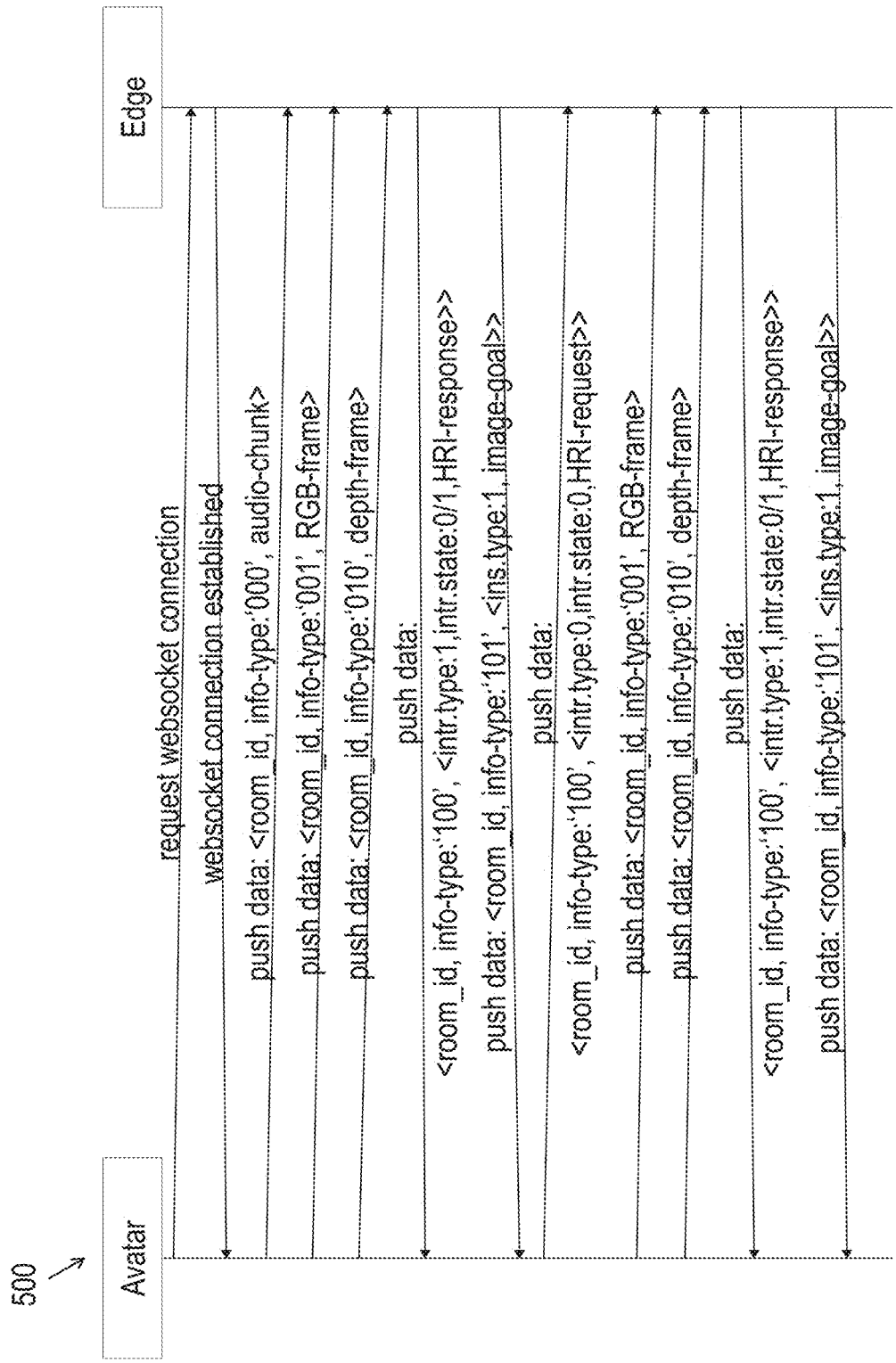

FIG. 5(a)&(b) is a typical exchange for the communication protocol between the edge and the robot for computation offloading and decision sharing for speech analysis and navigation execution, in accordance with some embodiments of the present disclosure. The AR-based point navigation takes a point on the operator's FoV as input. It is then transformed into a goal in the 3D space by registering using the value of the depth sensor. The point is then projected onto the floor and the robot navigates to the nearest possible goal. The Map-based Navigation is built on the point navigation. The avatar receives from operator a high-level point goal on a pre-loaded map. The way points from source to destination are derived using Dijkstra algorithm and are converted to low level commands using Timed Elastic Band (TEB) planner. The speech HRI based navigation also uses the AR goal in the backend. The speech HRI independently performs command detection and inference. The navigation logic coverts the inference into a point on the operator's FOV and then the AR goal module takes over.

Figure 4:
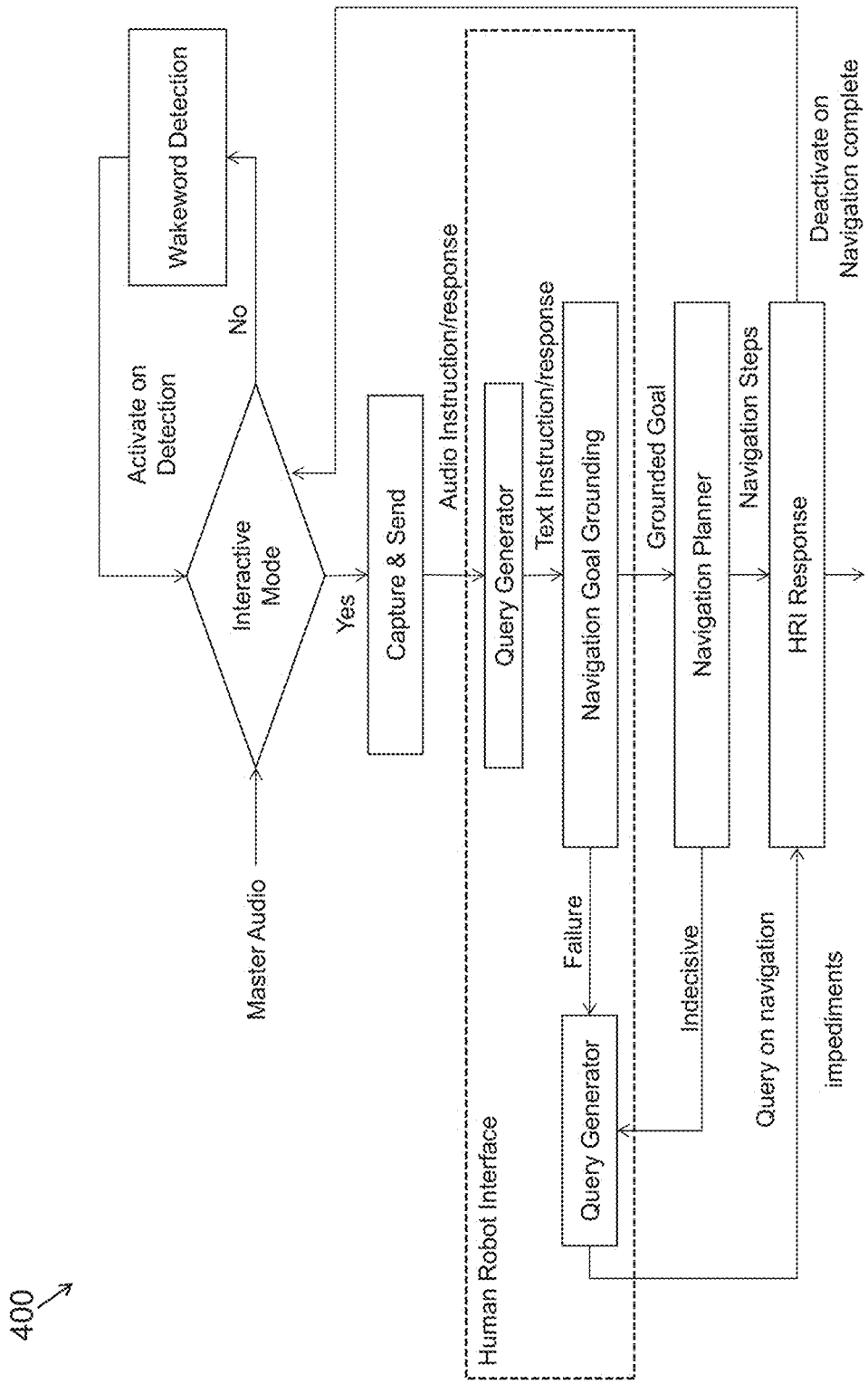
FIG. 4 is a block diagram to illustrate network interfacing of the telepresence robotic system, according to an embodiment of the present disclosure.

Referring FIG. 4, a functional block diagram (400) to illustrate a network interfacing of the telepresence robotic system (100), according to an embodiment of the present disclosure. The speech HRI continuously scans the operator's audio at the avatar's audio-out driver (by continuously creating a chunk of 30 ms) and listens for a typical wake-word which is considered as the harbinger of a following instruction. The wake-word detection happens at the avatar. Once a wake-word is detected it is notified to the operator via the BTS API and the P2P data channel. Since then, the speech HRI expects arrival of a command from the operator and sends 4s worth of compressed audio to the edge where it is analyzed by an Automatic Speech Recognition (ASR) module leading the speech HRI into interactive mode. Once the textual task instruction is produced, it is grounded in terms of mapping the task type to the robot's capability and referring objects with the known set of objects/location. This is done by a task conversational agent for the robot. The present FOV frame captured at the avatar is also transferred to the edge for this purpose. If there is a problem in goal grounding or navigation, the telepresence robotic system (100) generates a suitable query for the user. Else, a positive response is generated which is shared with the operator, and the avatar exits the interactive mode. If a query is received, it continues to remain in interactive mode and expects an audio response from the user. The recorded audio (at the avatar) is then sent to the edge for the query resolution. To facilitate exchanges between the avatar and the edge for map-based and speech HRI based navigations, A JSON-based application semantics is created on WebSocket as illustrated in FIG. 5(a)&(b).

- Packet structure (for navigation related information exchanges between Avatar and Edge): in JSON format:
  {
      "room-id": <>,
      "information-type": <>,
      "data": <>
  }
  - "Room-id": contains room-id for the session
  - "information-type":
        '000' : Audio chunk     '001' : RGB frame
        '010' : Depth frame     '011' : Odometry data
        '100' : HRI-based instruction '101' : Navigation instruction
  - "data": contains information-type specific data in JSON format
    i. Audio chunk: { "data": < audio-chunk byte buffer > }
    ii. RGB frame: { "data": < RGB frame buffer > }
    iii. Depth frame: { "data": < Depth frame buffer > }
    iv. Odometry data:
    {
        "x": <>,
        "y": <>,
        "theta": <>
    }
    v. HRI-based instruction:
    {
        "interaction-type": < 0 (request) / 1 (response) >,
        "interaction-state": < 0 (continue) / 1 (terminate) >,
        "instruction": <>
    }
    vi. Navigation instruction:
    {
        "instruction-type": < 0 (map-goal based command) /
            1 (image-goal based command) /
            2 (low-level command) >,
        "instruction": <>
    }
    If "instruction-type" is 0/1, then
    "instruction": { "x": <>, "y": <>, "w": <>, "h": <> }
    else, "instruction": { "command": < any low-level command like F(drive-forward)/B(drive-backward)/L(turn-left)/R(turn-right)/S(stop) > }

In the command mode, the received audio is recorded locally on the robot until a significant silence is detected by the VAD, which signifies end of instruction. Then, the recorded audio is transmitted to the robot-edge for further processing. At the robot edge, first, the audio is translated to text. For this, the telepresence robotic system (100) is configured to use wav2vec based automated speech recognition (ASR) model, which is trained using a transformer based deep neural network.

In another embodiment, the telepresence robotic system (100) (100) is configured to a plurality of tasks from the textual instruction to formulate planning problem based on a Planning Domain Definition Language (PDDL) format, wherein each of the plurality of tasks comprises one or more sub-tasks.

In yet another embodiment, the telepresence robotic system (100) (100) is configured to generate an execution plan to map the one or more sub-tasks using an FF-planner and the received snap shots for grounding a location, wherein the generated execution plan is communicated to the robot for execution. The execution plan is generated using the FF-planner that maps subtasks to robot's action level API. The execution plan is communicated to the robot, where the plan is executed through API calls. At this point, the robot exits from the command mode. In case the robot-edge fails to decode the task instruction, the telepresence robotic system (100) (100) generates a query for the operator that is passed onto the operator's devices through the robot.

It would be appreciated that an embodied AI agent needs to perform very well is cognitive navigation. In this regard, the cognitive navigation is classified into a point goal (go to a point in space), an object goal (go to a semantically distinct object instance), and an area goal (go to a semantically distinct area). It is imperative that out-of-view object finding is a needed feature of the telepresence robotic system. As an example, if an operator wants to find where an object (say laptop) is at a remote location. Instead of manually driving and searching the entire indoor area, this task can help overcome the limitation of no doctors in safe homes contagion for close proximity. A single robot used across multiple patients can carry instruction of doctors as well patients given to the robot to locate the object on its own.

Herein, the operator instructs at master's end to find an object. The visual perception/snap shots (camera feed of scene) of the robot is continuously processed in to identify current objects and regions in view. A Graph Convolution Network (GCN) is trained with spatial relation weights and successful object finding trajectories initially. At evaluation time, based on a policy of object finding given visible regions, history of walks and target object, the aforementioned trained model is used to calculate similarity score of current walk with trained walk data of same category of object. The next actuation moves (move back, move forward, rotate left, rotate right) command is sent to the 'Robot' for execution using off-the-shelf ROS motion planning.

In a point goal navigation, given a start location and an end goal location for a ground robot, the aim is to navigate the robot to the target within a certain threshold without colliding with fixed obstacles. The robot is provided with a camera, depth sensor, robot velocity and a compass that gives at each timestep, the distance to goal and the direction of the goal (also referred to as goal compass). The operator starts with deterministic planners that are separate from sensing mechanisms, so that they can be used in any environment without pretraining. Also, use a top down egocentric representation for the map, which is relatively easier agnostic to sim2real transfers. Further, an active neural simultaneous localization and mapping (SLAM) framework is augmented to work with depth images and incorporate robot compass information to navigate to a certain goal location.

Further, the robot's velocity is accumulated to find the noisy current pose of the robot which is fed along with a depth map obtained from infrared depth sensors such as RealSense. The depth Image point cloud is flattened along the vertical axis to obtain an ego-centric projection of the top-down map which the robot sees from their current point of view. This along with the pose is used by the Neural SLAM block to estimate the transform between the robot and the ground coordinates. This is used by the spatial transform block (ST) to update the unified geocentric map. The geocentric map is used to decide the motion trajectory which is then executed by the local policy at each timestep to give an action. The Local policy is an imitation learning-based planner that given the first person view and the available cost map obtained by Fast marching motion planner picks the right action that aligns the robot to the trajectory given by FMMP (fastest mixing Markov process).

Figure 6:
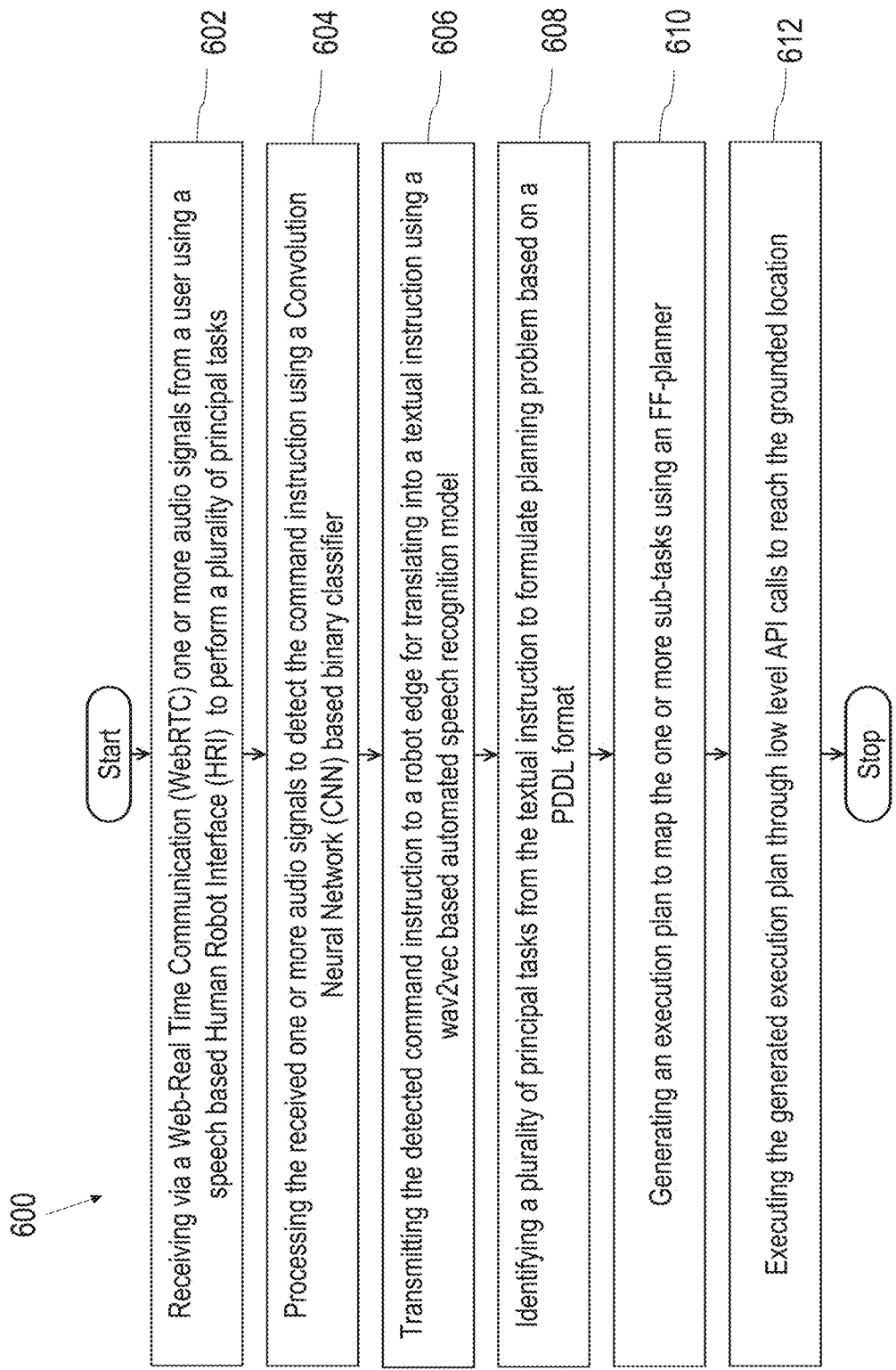
FIG. 6 is a flow diagram to illustrate a processor-implemented method utilizing a telepresence robotic system having cognitive capabilities, in accordance with some embodiments of the present disclosure.

Referring FIG. 6 to illustrate a processor-implemented method (600) utilizing a telepresence robotic system (100) having cognitive capabilities, in accordance with an example embodiment.

Initially, at the step (602), receiving, via a Web-Real Time Communication (WebRTC), one or more audio signals from an operator using a speech based Human Robot Interface (HRI) and one or more visual snap shots from a current Field of View (FoV) of a robot to perform a plurality of tasks. Herein, the one or more audio signals comprising a command instruction to interact with the robot and an ordinary speech to interact with remote audience through the robot.

At the next step (604), processing, via a one or more hardware processors, the received one or more audio signals to detect the command instruction using a Convolution Neural Network (CNN) based binary classifier, wherein the detected command instruction are transmitted to a robot edge.

At the next step (606), transmitting, via a cloud and edge based hybrid communication architecture, the detected command instruction to a robot edge for translating into a textual instruction using the ASR model, wherein the ASR model is trained using a transformer based deep neural network. The cloud and edge based hybrid communication architecture comprising an application protocol on a WebSocket for exchanging the one or more audio signals and the one or more visual snap shots between the robot and the robot edge to distribute the computation responsibility and decision process for detecting command instruction and determining navigation trajectories.

At the next step (608), identifying, a plurality of tasks from the textual instruction to formulate planning problem based on a Planning Domain Definition Language (PDDL) format, wherein each of the plurality of tasks comprises one or more sub-tasks. Herein, the plurality of tasks comprising cognitive navigation of the robot to a predefined location within a predefined environment, moving closer to or away from a predefined object and person, and tilting a camera. Further, the cognitive navigation is classified into a point goal, an object goal, and an area goal based on the operator specifies a point destination on the field of view, or an arbitrary object within the field of view or any area within or beyond the field of view respectively.

In another aspect, wherein the cognitive navigation of the robot to a predefined location within a predefined environment is illustrated in accordance with an example embodiment. Herein, at least one visual perception of the robot is captured by the robot and the captured at least one visual perception is processed to identify current objects and regions in view using a Graph Convolution Network (GCN). Herein, the GCN is trained with spatial relation weights and a successful object finding trajectories. Further, a similarity score of a current walk with a trained walk data of a predefined category of object is calculated based on a policy of object, predefined visible regions, history of walks and a target object to execute a next actuation move command based on an off-the-shelf ROS motion planning.

At the next step (610), generating, via the one or more hardware processors, an execution plan to map the one or more sub-tasks using an FF-planner and the received snap shots for grounding a location, wherein the generated execution plan is communicated to the robot for execution.

At the last step (612), executing, via the one or more hardware processors, the generated execution plan through low level API calls to reach the grounded location.

Test Result:

In one aspect, a testing framework contains scenes from the Gibson Environment and loaded on the iGibson simulator. The robot is spawned at a random location on the map, away from obstacles and given a random goal to reach. The polar coordinates of the goal with respect to the robot is available to the robot at each timestep. The operator updates the goal fed to the algorithm at every 25 timesteps to prevent oscillations arising from when two separate trajectories have very similar cost to reach the goal. The robot is given 500 timesteps to reach a random goal within the environment. Any collision is classified as a failure. Also not being able to reach within 0.5 meters of the goal is also considered a failure.

In another aspect, when the robot is moving in an unknown environment, it is imperative to create a map of its surroundings while it is moving. Herein, a visual semantic map is introduced that uses odometry data of the robot combined with perception (like RGB camera) to create a map that is both metric (relative distance level granularity) and topological (connection between scene graphs). The map is further enhanced with external semantic level features to link regions and objects in view with variety of robotic tasks. Herein, the history of scene graphs extracted from a sequence of scenes along with their time synced odometry data helps in generating the map. The initial position of the robot is taken as (0,0,0) in 3-D co-ordinate space. In case the robot is navigating in the same floor or elevation, the z-axis (height) will be always positive, whereas translation of robot will happen in (x, y) plane. The z-axis data points help in aiding the robot in where to look in a space while finding an object.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of rich cognitive navigation strategies for a telepresence robotic system. This includes giving instruction remotely over network to go to a point in an indoor space, to go an area, to go to an object. This does not exist as an integrated solution in remote operation. Also, human robot interaction to give and understand interaction is not integrated in a common telepresence framework. The embodiments herein provide a telepresence robotic system empowered with smart navigation. Further, the embodiments herein focus on the navigation problems of point, area and object, whereby the robot needs to reach a target location based on the visual cues, priors, trained predictions. The disclosure provides a unique solution to the problem based on in situ intelligent visual semantic mapping of the live scene capture by the robot. It further presents the Edge-centric architecture of a telepresence robotic system (100) comprising a speech recognition based HRI, a navigation module and a real-time WebRTC based communication framework that holds the entire system together. The telepresence robotic system (100) establish the efficacy of the proposed smart navigation algorithm through benchmarking experiments and finally concludes by describing a real-life deployment of the telepresence robotic system.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
   receiving, via a Web-Real Time Communication (WebRTC) one or more audio signals from an operator using a speech based Human Robot Interface (HRI), and one or more visual snap shots from a current Field of View (FoV) of a robot to perform a plurality of tasks, wherein the one or more audio signals comprising a command instruction to interact with the robot and an ordinary speech to interact with remote audience through the robot;
   processing, via one or more hardware processors, the received one or more audio signals to detect the command instruction using a Convolution Neural Network (CNN) based binary classifier, wherein the detected command instruction are transmitted to a robot edge;
   transmitting, via a cloud and edge based hybrid communication architecture, the detected command instruction to a robot edge for translating the command instruction into a textual instruction using an automated speech recognition model, wherein the automated speech recognition model is trained using a transformer based deep neural network;
   identifying, via the one or more hardware processors, the plurality of tasks from the textual instruction to formulate planning problem based on a Planning Domain Definition Language (PDDL) format, wherein each of the plurality of tasks comprises one or more sub-tasks;
   generating, via the one or more hardware processors, an execution plan to map the one or more sub-tasks using a fast-forward (FF)-planner and the received one or more visual snap shots for grounding a location; and
   executing, via the one or more hardware processors, the generated execution plan through low level application programming interface (API) calls to reach the grounded location.

2. The processor-implemented method of claim 1, wherein the cloud and edge based hybrid communication architecture comprising an application protocol on a Web-Socket for exchanging the one or more audio signals and the one or more visual snap shots between the robot and the robot edge to distribute the computation responsibility and decision process for detecting command instruction and determining navigation trajectories.

3. The processor-implemented method of claim 1, wherein the plurality of tasks comprising cognitive navigation of the robot to a predefined location within a predefined environment, moving closer to or away from a predefined object and person, and tilting a camera.

4. The processor-implemented method of claim 1, wherein the cognitive navigation is classified into a point goal, an object goal, and an area goal based on the operator specifies a point destination on the field of view, or an arbitrary object within the field of view or any area within or beyond the field of view respectively.

5. The processor-implemented method of claim 1, wherein the cognitive navigation of the robot to a predefined location within a predefined environment comprising steps of:

capturing, via the one or more hardware processors, at least one visual perception of the robot;

processing, via the one or more hardware processors, the captured at least one visual perception to identify current objects and regions in view using a Graph Convolution Network (GCN), wherein the GCN is trained with spatial relation weights and a successful object finding trajectories;

calculating, via the one or more hardware processors, a similarity score of a current walk with a trained walk data of a predefined category of object based on a policy of object, predefined visible regions, history of walks and a target object; and executing, via the one or more hardware processors, a next actuation move command using an off-the-shelf ROS motion planning.

6. A telepresence robotic system comprising:

a Web-Real Time Communication (WebRTC) to receive one or more audio signals from an operator using a speech based Human Robot Interface (HRI) and one or more visual snap shots from a current Field of View (FoV) of a robot to perform a plurality of tasks, wherein the one or more audio signals comprising a command instruction to interact with the robot and an ordinary speech to interact with remote audience through the robot;

one or more hardware processors;

a memory in communication with the one or more hardware processors, wherein the one or more hardware processors are configured to execute programmed instructions stored in the memory, to:

process the received one or more audio signals to detect the command instruction using a Convolution Neural Network (CNN) based binary classifier;

transmit the detected command instruction to a robot edge via a cloud and edge based hybrid communication architecture for translating the command instruction into a textual instruction using an automated speech recognition model, wherein the automated speech recognition model is trained using a transformer based deep neural network;

identify the plurality of tasks from the textual instruction to formulate planning problem based on a Planning Domain Definition Language (PDDL) format, wherein each of the plurality of tasks comprises one or more sub-tasks;

generate an execution plan to map the one or more sub-tasks using an fast-forward (FF)-planner and the received one or more visual snap shots for grounding a location; and execute the generated execution plan through low level application programming interface (API) calls to reach the grounded location.

7. The telepresence robotic system of claim 6, wherein the plurality of tasks comprising cognitive navigation of the robot to a predefined location within a predefined environment, moving closer to or away from a predefined object and person, and tilting a camera.

8. The telepresence robotic system of claim 6, wherein the cognitive navigation of the robot to a predefined location within a predefined environment comprising steps of:

capturing, via the one or more hardware processors, at least one visual perception of the robot;

processing, via the one or more hardware processors, the captured at least one visual perception to identify current objects and regions in view using a Graph Convolution Network (GCN), wherein the GCN is trained with spatial relation weights and a successful object finding trajectories;

calculating, via the one or more hardware processors, a similarity score of a current walk with a trained walk data of a predefined category of object based on a policy of object, predefined visible regions, history of walks and a target object; and executing, via the one or more hardware processors, a next actuation move command based on an off-the-shelf ROS motion planning.

9. The telepresence robotic system of claim 6, wherein the cloud and edge based hybrid communication architecture comprising an application protocol on a WebSocket for exchanging the one or more audio signals and the one or more visual snap shots between the robot and the robot edge to distribute the computation responsibility and decision process for detecting command instruction and determining navigation trajectories.

10. The telepresence robotic system of claim 6, wherein the cognitive navigation is classified into a point goal, an object goal, and an area goal based on the operator specifies a point destination on the field of view, or an arbitrary object within the field of view or any area within or beyond the field of view respectively.

11. A non-transitory computer readable medium storing one or more instructions which when executed by one or more processors on a telepresence robotic system, cause the one or more processors to perform method comprising:

receiving, via a Web-Real Time Communication (WebRTC), one or more audio signals from an operator using a speech based Human Robot Interface (HRI), and one or more visual snap shots from a current Field of View (FoV) of a robot to perform a plurality of tasks, wherein the one or more audio signals comprising a command instruction to interact with the robot and an ordinary speech to interact with remote audience through the robot;

processing, via a one or more hardware processors, the received one or more audio signals to detect the command instruction using a Convolution Neural Network (CNN) based binary classifier;

transmitting, via the one or more hardware processors, the detected command instruction to a robot edge for translating the command instruction into a textual instruction using an automated speech recognition model, wherein the automated speech recognition model is trained using a transformer based deep neural network;

identifying, via the one or more hardware processors, the plurality of tasks from the textual instruction to formulate planning problem based on a Planning Domain Definition Language (PDDL) format, wherein each of the plurality of tasks comprises one or more sub-tasks;

generating, via the one or more hardware processors, an execution plan to map the one or more sub-tasks using an fast-forward (FF)-planner and the received one or more snap shots for grounding a location; and executing, via the one or more hardware processors, the generated execution plan through low level application programming interface (API) calls to reach the grounded location.

* * * * *